United States Patent Office.

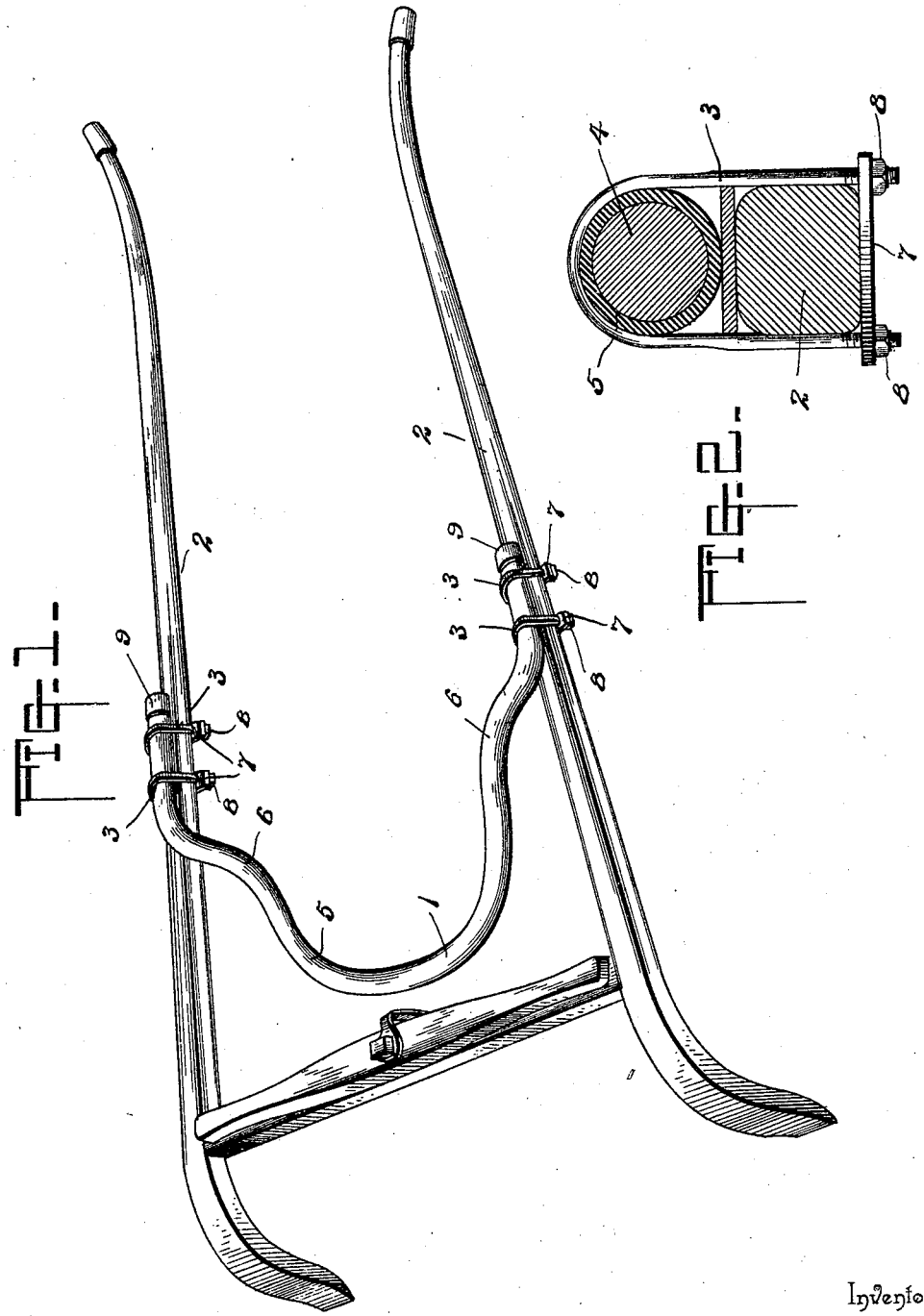

LIVINGSTON M. MAYS, OF ROUND ROCK, TEXAS.

HOLDBACK FOR VEHICLE-THILLS.

SPECIFICATION forming part of Letters Patent No. 578,018, dated March 2, 1897.

Application filed July 29, 1896. Serial No. 600,923. (No model.)

*To all whom it may concern:*

Be it known that I, LIVINGSTON M. MAYS, a citizen of the United States, residing at Round Rock, in the county of Williamson and State of Texas, have invented a new and useful Holdback for Thills, of which the following is a specification.

The invention relates to improvements in holdbacks for thills.

The object of the present invention is to improve the construction of holdbacks for thills and to provide a simple, inexpensive, and efficient one, adapted to be readily applied to a pair of thills and capable of dispensing with a portion of the harness usually employed.

A further object of the invention is to provide a holdback which will effectually prevent a horse from kicking an occupant of a vehicle and which will not injure an animal.

The invention consists in the construction and novel combination and arrangement of parts hereinafter fully described, illustrated in the accompanying drawings, and pointed out in the claim hereto appended.

In the drawings, Figure 1 is a perspective view of a holdback constructed in accordance with this invention and shown applied to a pair of thills. Fig. 2 is a detail sectional view of one end of the holdback, illustrating the manner of securing the same to the adjacent thill.

Like numerals of reference designate corresponding parts in both figures of the drawings.

1 designates a substantially U-shaped holdback, secured at the ends of its sides to each of a pair of thills 2 by a pair of clips 3 and consisting of a rod or bar 4, which forms a core, and a tubular elastic covering 5, constructed of rubber, leather, or other suitable material and forming a cushion to prevent an animal from being injured by the holdback. The bar or rod 4 and the tubular cover 5, which are preferably circular in cross-section, as illustrated in the accompanying drawings, may be rectangular in cross-section in order to present outer flat faces, or any other desired configuration may be used, if desired.

The central portion of the holdback is curved, and the sides thereof, at points intermediate of their ends, are bent outward at 6, and the terminals of the holdback are disposed directly above the thills and are engaged by the clips 3. The clips 3, which embrace the ends of the holdback and the thills, are provided beneath the latter with clip-plates 7, which are engaged by nuts 8.

The holdback is adjustably secured to the thills by means of the clips and is adapted to be readily moved forward or backward, and it may be raised or lowered by interposing blocks or wedges 10 between its terminals and the upper faces of the thills and arranging them between the sides of the clips. The blocks or wedges 10 are held against lateral movement by the sides of the clips, and they are of sufficient length to extend across the space between the members of each pair of clips, and they project slightly beyond them. The ends of the holdback are provided with caps 9, which are cylindrical and which may be secured in place by any suitable means. These caps 9 form shoulders and operate as stops to prevent any forward movement of the blocks.

The holdback is adapted to dispense with the breeching of harness, and it effectually prevents an animal from kicking an occupant of a vehicle.

It will be seen that the holdback is exceedingly simple and inexpensive in construction, that it is strong and durable, and that it is adapted to be readily applied to a pair of thills.

It will also be apparent that it is capable of ready adjustment to suit an animal, that it dispenses with a portion of the harness usually employed, and that it will prevent an animal from kicking an occupant of a vehicle.

What I claim is—

In a device of the class described, the combination with a pair of thills, of a substantially U-shaped holdback having its terminals disposed longitudinally of and arranged on the upper faces of the thills, caps fitting over the ends of the holdback and forming exterior annular shoulders, the clips arranged in pairs at each end of the holdback and securing the same to the thills, and the blocks or wedges interposed between the holdback and the upper faces of the thills, arranged between the pairs of clips and held against forward movement by the shoulders formed by the clips, said blocks or wedges being adapted to raise the holdback to secure the proper adjustment, substantially as described.

In testimony that I claim the foregoing as my own I have hereto affixed my signature in the presence of two witnesses.

LIVINGSTON M. MAYS.

Witnesses:
JNO. D. GILLUM,
J. M. BLACK.